United States Patent [19]
Leeper

[11] Patent Number: 5,938,555
[45] Date of Patent: Aug. 17, 1999

[54] SPEED SENSITIVE LIMITED SLIP DIFFERENTIAL

[75] Inventor: Robert Leeper, Fort Wayne, Ind.

[73] Assignee: Auburn Gear, Inc., Auburn, Ind.

[21] Appl. No.: 09/030,167

[22] Filed: Feb. 25, 1998

[51] Int. Cl.$^6$ .................................................. F16H 48/22
[52] U.S. Cl. ............................................................. 475/88
[58] Field of Search ................................................ 475/88

[56] References Cited

U.S. PATENT DOCUMENTS

| | | | |
|---|---|---|---|
| 2,922,319 | 1/1960 | Burner | 74/711 |
| 2,949,792 | 8/1960 | Smith | 74/711 |
| 3,229,550 | 1/1966 | Nickell | 74/711 |
| 3,230,795 | 1/1966 | Mueller | 74/711 |
| 3,251,244 | 5/1966 | Nickell | 74/711 |
| 3,350,961 | 11/1967 | Dodge | 74/711 |
| 3,393,582 | 7/1968 | Mueller | 74/711 |
| 3,490,312 | 1/1970 | Seitz et al. | 74/711 |
| 3,546,969 | 12/1970 | Gibson et al. | 74/711 |
| 3,724,289 | 4/1973 | Kennicutt | 74/711 |
| 3,987,689 | 10/1976 | Engle | 74/711 |
| 4,012,968 | 3/1977 | Kelbel | 74/711 |
| 4,041,804 | 8/1977 | Clark | 74/711 |
| 4,272,993 | 6/1981 | Kopich | 74/711 |
| 4,445,400 | 5/1984 | Sullivan et al. | 74/711 |
| 4,612,825 | 9/1986 | Engle | 74/711 |
| 4,719,998 | 1/1988 | Hiramatsu et al. | 192/0.033 |
| 4,727,966 | 3/1988 | Hiramatsu et al. | 192/0.033 |
| 5,226,861 | 7/1993 | Engle | 475/234 |
| 5,310,388 | 5/1994 | Okeuoglu et al. | 475/88 |
| 5,536,215 | 7/1996 | Shaffer et al. | 475/88 |
| 5,556,344 | 9/1996 | Fox | 475/235 |

OTHER PUBLICATIONS

"Visco–Lok: A Speed Sensing Limited–Slip Device with High–Torque Progressive Engagement", SAE Technical Paper Series, No. 960718, Feb. 1996.

"Eaton Electronically Controlled Limited Slip", Eaton Corporation.

"LSD's Limited Slip Differentials", Tochigi Fuji Sangyo Kabushiki Kaisha.

"Visco Lok Benefits/Highlights", GKN Viscodrive GmbH.

"Tech & Trends Gerodisc Slashes Cost, Weight in All–Wheel Drive", Aug. 1992.

"Disco–Tech", Automotive Industries, Jun. 1992.

"Development of the Electro–Magnetic Controlled Limited Slip Differentiall Unit (EMCD)", Tochigi Fuji Sangyo K.K.

"Eaton Automatic Locker", Eaton Corporation.

*Primary Examiner*—Dirk Wright
*Attorney, Agent, or Firm*—Baker & Daniels

[57] ABSTRACT

A speed sensitive limited slip differential having a sealed, self contained clutch actuator which expands and retracts as required to frictionally seat a clutch element against a surface of the differential casing. The clutch actuator comprises a housing portion and a piston portion which define two fluid chambers and a gerotor pump assembly contained therein for transferring fluid between the two fluid chambers. The gerotor pump assembly is splined to an output element to transfer fluid between the two chambers when sufficient differential rotation between the output element and the casing exists. The transfer of fluid between the two chambers results in the axial expansion of the actuator housing and the actuator piston to provide an axial force on a side gear to thereby frictionally seat the clutch element against a surface of the differential casing. The sealed, self contained feature allows the present limited slip differential to operate in a simple, reliable manner.

17 Claims, 3 Drawing Sheets

FIG_1

FIG_5

FIG_6

SPEED SENSITIVE LIMITED SLIP DIFFERENTIAL

BACKGROUND OF THE INVENTION

1. Field of the Invention

The present invention relates to differentials, and more particularly, to limited slip differentials.

2. Description of the Related Art

Differentials are well known in the prior art and allow a pair of output shafts operatively coupled to an input shaft to rotate at different speeds, thereby allowing the wheel associated with each output shaft to maintain traction with the road while the vehicle is turning. Such a device essentially distributes the torque provided by the input shaft between the output shafts. However, the necessity for a differential which limits the differential rotation between the output shafts to provide traction on slippery surfaces is well known.

The completely open differential, i.e. a differential without clutches or springs, is unsuitable in slippery conditions where one wheel experiences a much lower coefficient of friction than the other wheel, for instance, when one wheel of a vehicle is located on a patch of ice and the other wheel is on dry pavement. In such a condition, the wheel experiencing the lower coefficient of friction loses traction and a small amount of torque to that wheel will cause a "spin out" of that wheel. Since the maximum amount of torque which can be developed on the wheel with traction is equal to torque on the wheel without traction, i.e. the slipping wheel, the engine is unable to develop any torque and the wheel with traction is unable to rotate. A number of methods have been developed to limit wheel slippage under such conditions.

Prior methods of limiting slippage between the side gears and the differential casing use a frictional clutch mechanism, either clutch plates or a frusto-conical structure, and a bias mechanism, usually a spring, to apply an initial preload between the frictional clutch mechanism and the differential casing. By using a frictional clutch mechanism with an initial preload, for example a spring, a minimum amount of torque can always be applied to the wheel having traction, i.e. the wheel located on dry pavement. The initial torque generates gear separating forces which further engage the frictional clutch and develop additional torque. Examples of such limited slip differentials are disclosed in U.S. Pat. Nos. 4,612,825 (Engle), 5,226,861 (Engle) and 5,556,344 (Fox), which are assigned to the assignee of the present invention and expressly incorporated herein by reference.

The initial preload initiates the development of side gear separating forces which provide further braking action between the side gears and the differential casing. In general, gear separating forces are forces induced on any set of meshing gears by the application of torque to the gears and which forces tend to separate the gears. In a differential, the development of torque will create side gear separating forces which tend to move the side gears away from the pinion gears. On a surface having a low coefficient of friction, the initial preload creates contact and friction pressure between the differential casing and the clutch mechanism disposed between the side gears and the differential casing to allow the engine to develop an initial torque. This initiation of torque transfer induces gear separating forces on the side gears which tend to separate the side gears to further increase friction between the clutch mechanism and the casing. The increased friction pressure of the clutch allows more torque to be developed, thus further increasing the side gear separating forces and limiting the slippage between the side gears and the differential casing.

However, such preloaded clutches are usually always engaged, and thus are susceptible to wear, causing undesirable repair and replacement costs. Additionally, such clutch mechanisms usually employ spring mechanisms which add to the cost and difficulty of manufacture.

Additionally, such a preloaded clutch mechanism may lock the output shafts together in situations where differential rotation is necessary. For example, if the vehicle is making a turn when the wheels are sufficiently engaged on the road surface and a sufficient amount of torque is developed, the differential will tend to lock up the output shafts due to the action of the side gear separating forces created by the developed torque. This may occur, for example, during tight turns on surfaces with a low coefficient of friction. In such a case, even though differential rotation is required, the torque and side gear separating forces lock up the two output shafts causing one wheel to drag and slide along the road surface.

Another method of limiting slippage involves the use of a frictional clutch between the side gears and the differential casing based on the difference in rotational speeds between the two output shafts. The frictional clutch may be actuated by various hydraulic pump mechanisms which may be external to the differential case or may be constructed of elements disposed inside the differential casing. However, such mechanisms usually are complicated and also add to the cost and difficulty of manufacture. Also, such mechanisms usually require a fluid source, a fluid sink and various other attachments associated with a hydraulic pump mechanism. These auxiliary mechanisms add to the difficulty and cost of manufacture.

Thus, what is needed is a simple, durable and reliable limited slip differential which can effectively provide torque to the wheel with traction.

What is also needed is a limited slip differential which is responsive to speed difference to provide the limited slip function only when required, i.e. limited slip when one wheel has lost traction and relatively open when sufficient torque is developed.

SUMMARY OF THE INVENTION

The present invention is a speed sensitive limited slip differential which includes a sealed, self contained, expandable clutch actuator which responds to the speed difference between a pair of output shafts. The clutch actuator provides axial force against a side gear and a clutch element so that the clutch element seats against a surface of the differential casing. The frictional seating of the clutch element against the casing surface transfers frictional torque between the casing and the clutch element to thereby transfer torque to the wheel having traction. The clutch actuator includes an actuator housing and an actuator piston which are coupled together and define two fluid chambers. A fluid pressure source is disposed in the clutch actuator to transfer fluid between the two fluid chambers. The fluid pressure source is actuated by the difference in rotational speed between the differential casing and the output shafts. The fluid pressure source may advantageously comprise a gerotor type pump.

The present invention provides, in one form thereof, a limited slip differential comprising a rotatable casing, a pinion gear rotatably supported in the rotatable casing, and a side gear rotatably supported in the casing and coupled to an output element. The side gear is meshingly engaged with the pinion gear. A clutch is disposed in the casing and is operatively coupled to the side gear. The clutch is adapted to frictionally seat against a surface of the rotatable casing to transfer frictional torque between the casing and the side gear. A sealed clutch actuator is disposed in the casing, the clutch actuator having a fluid pressure source contained therein. The fluid pressure source transfers fluid in response to differential rotation between the output element and the casing. The clutch actuator urges the clutch to frictionally seat against a surface of the rotatable casing in response to the transfer of fluid by the fluid pressure source.

It is an object of the present invention is to provide a simple, reliable limited slip differential which is responsive to the difference in speed of the output elements.

Another object of the present invention is to provide a limited slip differential which includes a fluid pressure source which responds to the speed difference between the differential casing and the output elements to seat a clutch element against the differential casing.

Still another object of the present invention is to provide a limited slip differential which includes a fluid pressure source disposed in a sealed, self contained, expandable clutch actuator mechanism.

Yet another object of the present invention is to provide a limited slip differential which includes a sealed, self contained clutch actuator mechanism which expands and retracts axially with respect to the rotatable casing to seat a clutch element against the differential casing.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the drawings represent a preferred embodiment of the present invention, the drawings are not necessarily to scale and certain features may be exaggerated in order to better illustrate and explain the present invention. The exemplification set out herein illustrates an embodiment of the invention, in one form, and such exemplification is not to be construed as limiting the scope of the invention in any manner.

DETAILED DESCRIPTION OF THE INVENTION

The embodiment disclosed below is not intended to be exhaustive or limit the invention to the precise form disclosed in the following detailed description. Rather the preferred embodiment is chosen and described so that others skilled in the art may be able to utilize its teachings.

Figure 1:
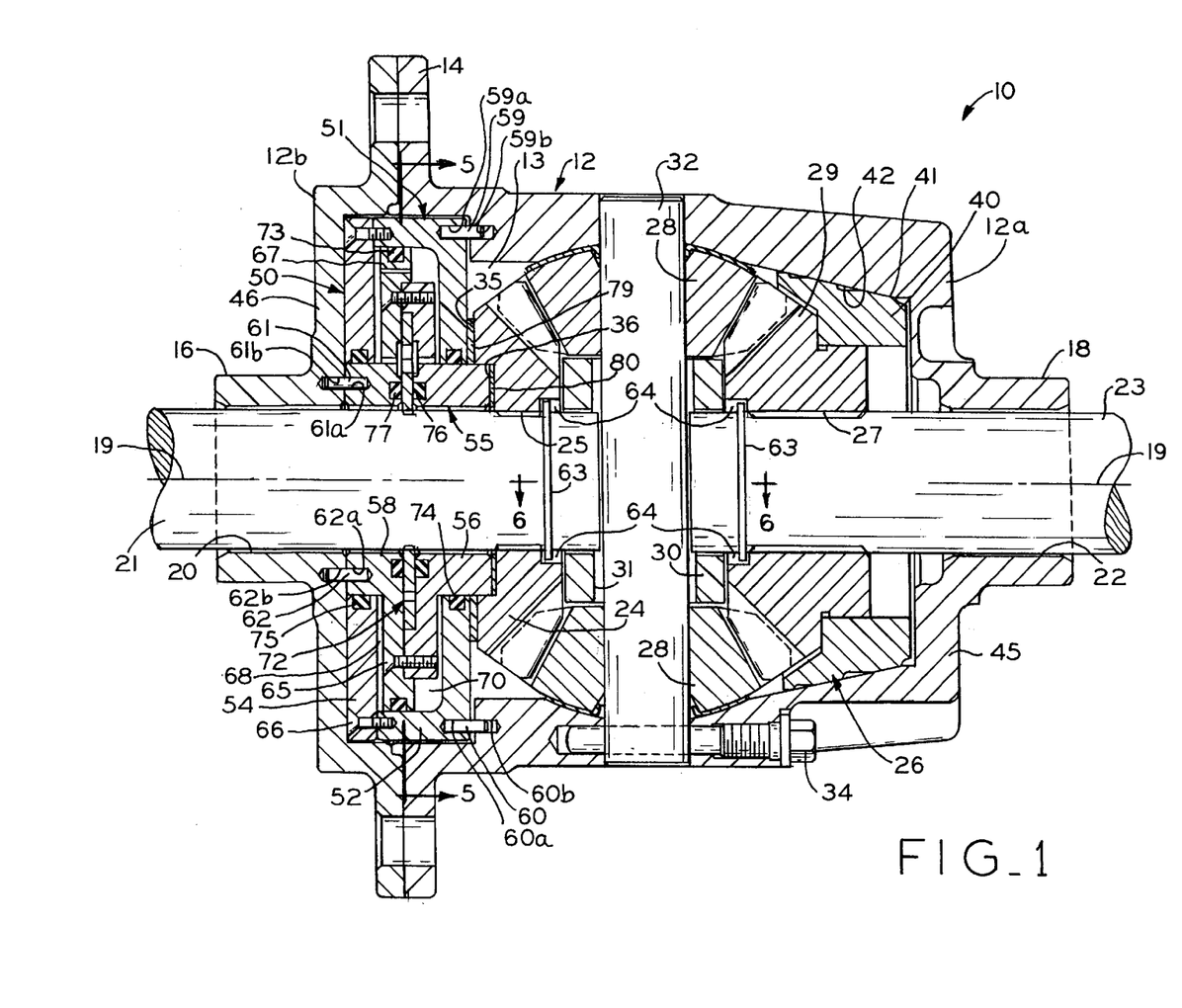
FIG. 1 is a sectional side view of a limited slip differential of the present invention.

Referring now to the drawings, and particularly to FIG. 1, limited slip differential 10 of the present invention comprises differential casing 12 which is constructed by joining casing parts 12a, 12b to form a generally cylindrical structure having inner cavity 13. Inner cavity 13 is constructed to hold a differential gear assembly and includes end walls 45, 46 formed by walls of casing parts 12a, 12b, respectively. The exterior surface of casing 12 includes flange 14 formed on one side thereof for connecting differential 10 to a driving ring gear (not shown) using conventional means, such as threaded fasteners (not shown). Casing 12 also includes hollow receiving hubs 16, 18 on each end, the hubs defining apertures 20, 22 for accepting output shafts 21, 23.

Disposed within inner cavity 13 are meshingly engaged pinion gears 28, side gear 24 and gear/cone member 26. Pinion gears 28 are disposed at right angles to side gear 24 and gear/cone member 26, and are rotatably mounted on cross pin 32. Cross pin 32 is fixedly attached to opposite sides of casing part 12a by at least one threaded fastener 34, generally midway between end walls 45 and 46. Cross pin 32 is locked in position within casing 12 such that pinion gears 28 rotate with casing 12 around axis 19 defined by hubs 16, 18. Pinion gears 28 can also rotate about the longitudinal axis of cross pin 32.

Figure 6:
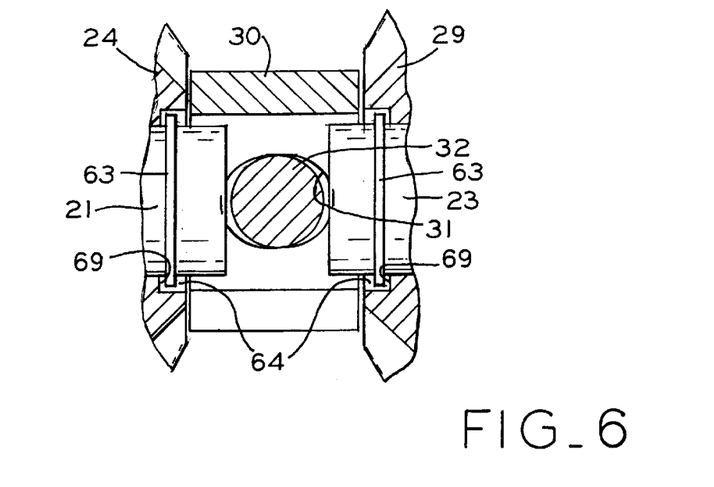
FIG. 6 is a fragmentary sectional plan view of the limited slip differential of the present invention taken along line 6—6 of FIG. 1, showing the cross pin and transfer block.

Side gear 24 and gear/cone member 26 are axially aligned and rotatably disposed within differential casing 12 to rotate with output shafts 21, 23 about axis 19 defined by hubs 16, 18. Side gear 24 and gear/cone member 26 include respective internal splines 25, 27 which engage corresponding splines of output shafts 21, 23. The roots and teeth of side gears 24 and gear/cone member 26 meshingly engage the roots and teeth of pinion gears 28 such that differential rotation can be effected between casing 12 and output shafts 21, 23. Side gear 24 and gear/cone member 26 each have, in their inward axial faces, annular step 64 in which "C" washer 63, seated in a mating annular groove provided in the surface of each shaft 21, 23, is disposed. "C" washer 63 prevents outwardly directed axial withdrawal of each shaft 21, 23 from side gear 24 and gear/cone member 26, respectively, by abutting adjacent axial surface 69 of side gear and gear/cone member step 64 (FIG. 6). Shafts 21, 23 may respectively slide inwardly towards one another through side gear 24 and gear/cone member 26 along splines 25, 27 to the extent that the end of each shaft abuts the outer surface of cross pin 32.

As shown in FIG. 1, side gear 24 is a unitary element, one side of which engages pinion gears 28 and another side of which contacts clutch actuator 50. The structure and operation of clutch actuator 50 is described further below.

Gear/cone member 26 comprises gear portion 29 coupled with cone clutch portion 40. Gear portion 29 engages pinion gears 28 and cone clutch portion 40 includes frusto-conical surface 41 which is adapted to frictionally seat against complementary frusto-conical surface 42 of casing 12. The seating of surface 41 against surface 42 transfers frictional torque between casing 12 and gear/cone member 26. As described further below, clutch actuator 50 actuates the seating of frusto-conical surface 41 against surface 42 as casing 12 and output shafts 21, 23 rotate at differing speeds.

Gear portion 29 and cone clutch portion 40 are coupled using any conventionally known method, such as splining, so that they rotate together. Due to the coupling, axial forces on gear portion 29 are transmitted to cone clutch portion 40 and frictional torque is transferred from differential casing 12 to gear portion 29 through cone clutch portion 40. Although gear/cone member 26 is shown as comprising separate gear and cone clutch portions that are coupled together, it is to be understood that gear/cone member 26 can be constructed as a unitary element which includes gear and cone clutch elements.

Transfer block 30 is disposed between and is in contact with side gear 24 and gear/cone member 26 to transfer axial thrust forces between side gear 24 and gear/cone member 26. Transfer block 30 includes generally elliptical through hole 31 extending therethrough and through which cross pin 32 extends (FIGS. 1 and 6). It can be seen that the distance between the two extreme ends of the elliptical cross section of hole 31 is greater than the diameter of cross pin 32, thus permitting transfer block 30 to move at right angles with respect to the longitudinal axis of cross pin 32. As will be further discussed below, the lateral movement of transfer block 30 relative to cross pin 32 allows side gear 24 to force gear/cone member 26 to the right as viewed in FIG. 1, thus forcing surfaces 41 and 42 into frictional engagement.

Figure 2:
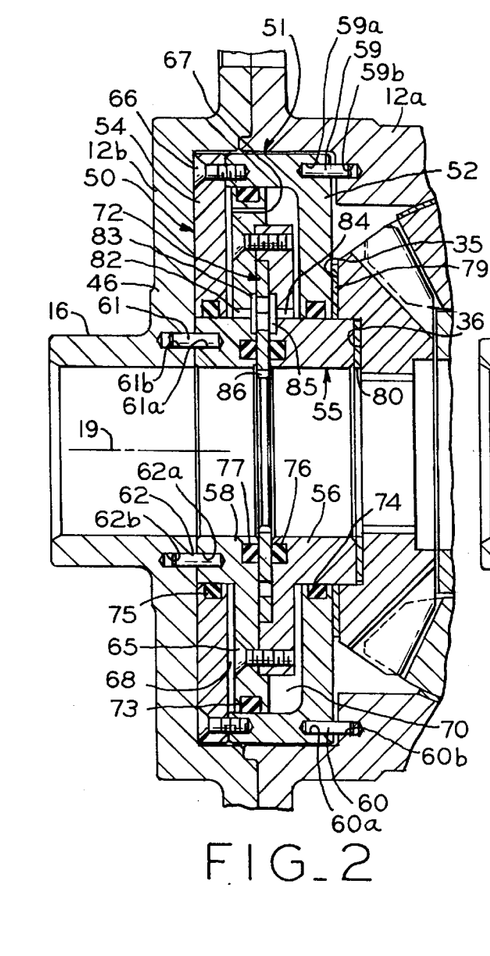
FIG. 2 is a fragmentary sectional side view of the limited slip differential of the present invention without the output shaft shown and with the clutch actuator in the extracted position.
Figure 3:
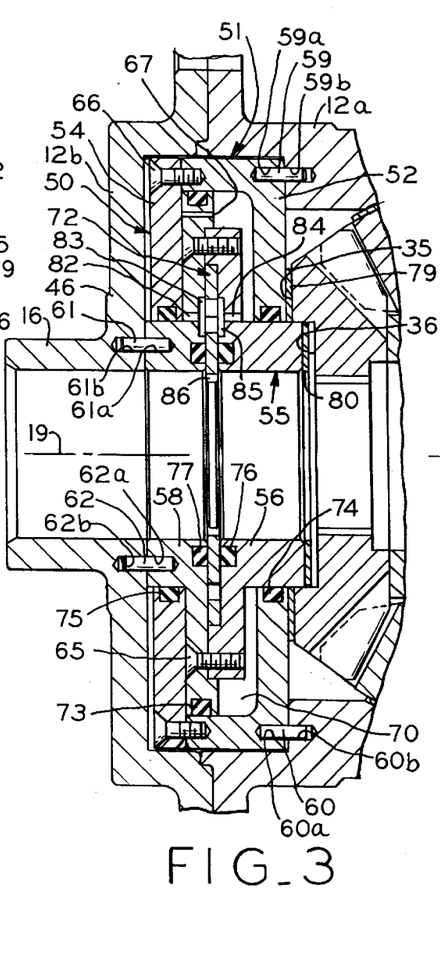
FIG. 3 is a fragmentary sectional side view of the limited slip differential of the present invention without the output shaft shown and with the clutch actuator in an extended position wherein the actuator housing contacts the side gear.
Figure 4:
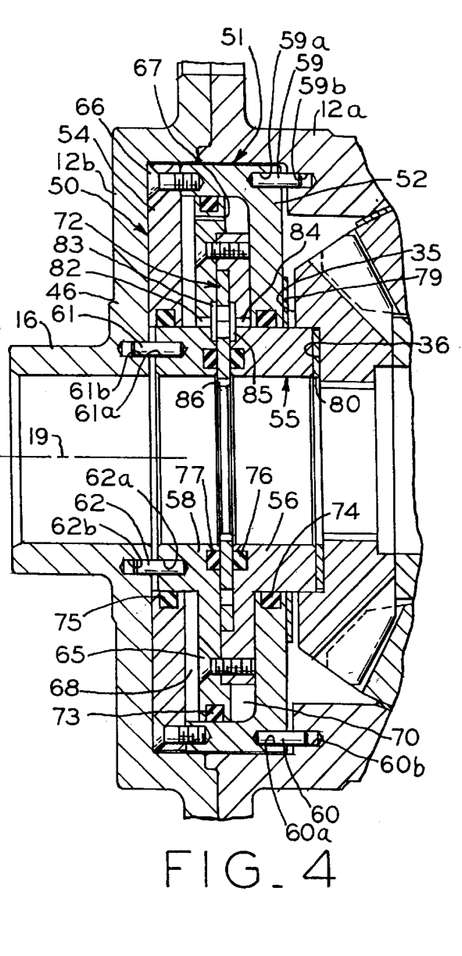
FIG. 4 is a fragmentary sectional side view of the limited slip differential of the present invention without the output shaft shown and with the clutch actuator in an extended position wherein the actuator piston contacts the side gear.

Clutch actuator 50 is now described with particular reference to FIGS. 2–4. Clutch actuator 50 is a sealed, self-contained, axially expandable mechanism which does not require an outside fluid source, sink or other auxiliary support attachments to be connected thereto. The self-contained feature greatly simplifies manufacture of the present limited slip differential as the number of parts which must be interconnected to form the clutch actuating mechanism is greatly reduced.

As shown in FIGS. 2–4, clutch actuator 50 comprises actuator housing 51 and actuator piston 55 coupled together to form fluid chambers 68, 70. Fluid chambers 68, 70 are fluidly connected through gerotor pump assembly 72 which is disposed in actuator piston 55. Actuator housing 51 is disposed around actuator piston 55 and forms the radial outer boundaries of fluid chambers 68, 70 relative to axis 19. Actuator housing 51 comprises housing portions 52, 54 joined and sealed together using flathead screws 66 and, for example, RTV sealant or an o-ring (not shown) between the interfacing housing portion surfaces. Actuator housing 51 moves as a single piece, with housing portion 52 disposed adjacent endwall 46 of casing part 12b. Actuator piston 55 comprises piston portions 56, 58 coupled together by flathead screws 65 and also moves as a single piece, with piston portion 58 disposed adjacent endwall 46 of casing part 12b. Actuator piston 55 is disposed around output shaft 21 (FIG. 1) and forms the radial inner boundaries of fluid chambers 68, 70 relative to axis 19.

Referring again to FIGS. 2–4, ring seals 74, 75 are disposed in grooves located in the respective radially inner edge of housing portions 52, 54 and surround piston portions 56, 58, respectively, to provide a fluid tight seal between the housing and piston portion surfaces. Ring seal 73 is disposed in a groove located in the radially outer edge surface of piston portion 58, engaging the adjacent inside radial surface of housing portion 52 to provide a fluid-tight seal between the two surfaces.

Actuator housing 51 and actuator piston 55 are axially movable with respect to casing 12 and independently movable with respect to each other. Anti-rotation pins 59, 60 are slidingly disposed in recesses 59a, 60a of actuator housing portion 52 and recesses 59b, 60b of casing part 12a, respectively, to prevent the rotation of actuator housing 51 with respect to casing 12. However, since anti-rotation pins 59, 60 slide within recesses 59a, 59b and 60a, 60b, respectively, actuator housing 51 can move axially with respect to casing 12. Housing portion 52 abuts thrust washer 79 which is adapted to contact side gear surface 35. Therefore, axial movement of actuator housing 51 towards the right as viewed in FIGS. 1–4 transmits axial force to side gear 24 via thrust washer 79 and side gear surface 35.

Likewise, anti-rotation pins 61, 62 are slidingly disposed within recesses 61a, 62a of piston portion 58 and recesses 61b, 62b of casing part 12b to prevent the rotation of actuator piston 55 with respect to casing 12. Again, since anti-rotation pins 61, 62 slide within recesses 61a, 62a and 61b, 62b, actuator piston 55 can move axially with respect to casing 12. Piston portion 56 abuts thrust washer 80 which is adapted to contact side gear surface 36. Therefore, axial movement of actuator piston 55 towards the right as viewed in FIGS. 1–4 transmits axial force to side gear 24 via thrust washer 80 and side gear surface 36.

As described above, actuator housing 51 and actuator piston 55 move independently and axially with respect to casing 12 and can contact endwall 46 of casing 12 and, respectively, side gear surfaces 35 and 36. Relative axial movement between actuator housing 51 and actuator piston 55 forces side gear 24 in a direction away from endwall 46. The movement directions of actuator housing 51 and actuator piston 55 depend on the fluid pressures in fluid chambers 68, 70. The development of fluid pressure in fluid chambers 68, 70 is described below.

Clutch actuator 50 includes gerotor pump assembly 72 which is disposed between piston portions 56, 58. Gerotor pump assembly 72 is in fluid communication with fluid chambers 68, 70 and is adapted to transfer fluid from one fluid chamber to the other when a speed difference exists between output shafts 21, 23 and casing 12. Referring to FIGS. 2–4, gerotor pump assembly 72 is connected to fluid chamber 68 via pump hole 82 and arcuate pump port 83 and to fluid chamber 70 via pump hole 84 and arcuate pump port 85. The direction of fluid transfer depends on the direction of rotation of the components of gerotor pump assembly 72 relative to casing 12.

Figure 5:
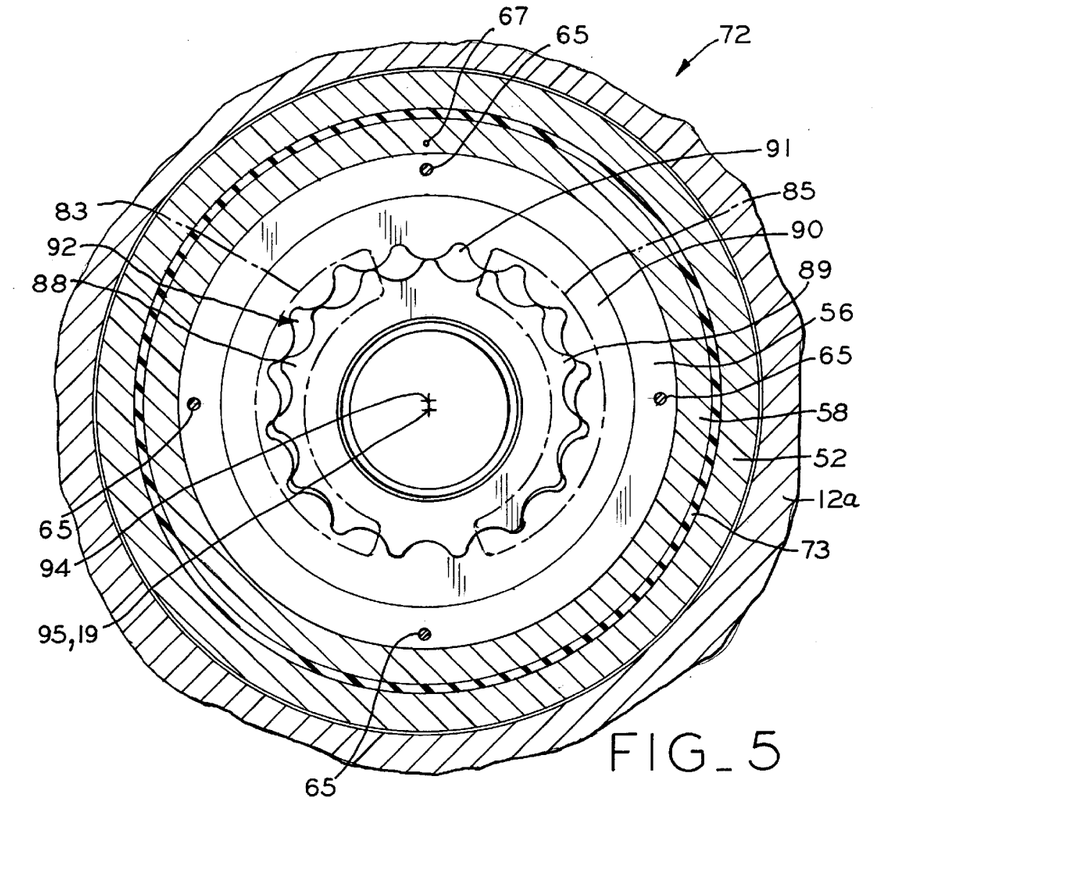
FIG. 5 is a fragmentary sectional end view of the limited slip differential of the present invention taken along line 5—5 of FIG. 1, showing elements of the gerotor pump assembly.

As shown in FIG. 5, gerotor pump assembly 72 includes impeller 88 disposed inside internal gear 90. Impeller 88 is splined to output shaft 21 via spline 86 and includes a plurality of teeth 89 evenly provided on its outer peripheral edge. Referring to FIGS. 2–4, ring seals 76, 77 are disposed in annular grooves in facing surfaces of piston portions 56, 58, respectively, and sandwich impeller 88 therebetween, providing a fluid tight seal between the respective side surfaces of impeller 88 and piston portions 56 and 58. Impeller 88, which rotates with shaft 21, is allowed to rotate with respect to actuator piston 55. Internal gear 90 can also rotate with respect to actuator piston 55 and includes on its inner edge a plurality of recesses 91 which engage teeth 89 of impeller 88. As shown in FIG. 5, there are more recesses 91 than teeth 89 and the center 95 of impeller 88, which is coaxial with axis 19, is not aligned with the center 94 of internal gear 90. As such, space 92 exists between the outer edge of impeller 88 and the inner edge of internal gear 90. Space 92 is continually reformed as impeller 88 and internal gear 90 rotate and their respective teeth 89 and recesses 91 intermesh.

As shown in phantom lines in FIG. 5, arcuate pump ports 83 and 85 are located opposite each other about axis 19 and, as shown in FIGS. 1–4, are also located on oppositely facing sides of gerotor pump assembly 72. It can be seen that if either output shaft 21, 23 rotates relative to casing 12, impeller 88 then rotates about axis 19 relative to actuator piston 55. The meshing engagement of impeller 88 with internal gear 90 causes internal gear 90 to rotate within actuator piston 55 such that a volume of fluid will be drawn in from one of pump ports 83, 85 into space 92 and is carried to and discharged into the other pump port. In this manner, gerotor pump assembly 72 transfers fluid from one of fluid chambers 68, 70 to the other whenever there is differential rotation between output shafts 21, 23 and casing 12, i.e., rotation between impeller 88 and internal gear 90. Therefore, the direction of fluid flow through gerotor pump assembly 72 depends on the rotational direction of impeller 88 and internal gear 90. As described below, fluid transfer in either direction expands clutch actuator 50 to thereby seat frusto-conical surface 41 against surface 42.

During normal operation, when output shafts 21, 23 and casing 12 rotate at about the same speed, impeller 88 and internal gear 90 rotate with actuator piston 55 because clutch actuator 50 rotates with casing 12 and impeller 88 rotates with output shaft 21, and thus no fluid transfer occurs. However, when output shafts 21, 23 and casing 12 rotate relative to one another, impeller 88 and internal gear 90 rotate with respect to actuator piston 55 to transfer fluid from one fluid chamber 68, 70 to the other.

Piston portion 58 includes bypass orifice 67 which allows fluid flow from the higher pressure fluid chamber to the lower pressure fluid chamber. When gerotor pump assembly 72 is not transferring fluid from one fluid chamber to the other, the fluid flow through bypass orifice 67 equalizes the pressures of fluid chambers 68, 70. Fluid flow through bypass orifice 67 also determines in part the clutching characteristics, including the amount of differential rotation required to actuate the seating of frusto-conical surface 41 against surface 42. Bypass orifice 67 returns a portion of the fluid transferred by gerotor pump assembly 72 to the low pressure fluid chamber. Thus, fluid pressure build-up in the high pressure chamber is relatively quick and occurs with a smaller speed difference between casing 12 and output shaft 21 if bypass orifice 67 is relatively small. However, fluid pressure build-up in the high pressure chamber will be slower and require a larger speed difference if bypass orifice 67 is relatively large. It is advantageous that bypass orifice 67 be smaller rather than larger to provide clutch actuation quicker and with less speed differentiation between shafts 21, 23 and casing 12. However, if bypass orifice 67 is sized too small, the sensitivity of clutch actuator 50 to the differential speed may be undesirably high, resulting in inside wheel hop during normal cornering. Therefore, bypass orifice 67 should be sized appropriately for the application of differential 10, with consideration given to factors such as tire outside diameter and material characteristics, vehicle turning radius, wheelbase and axle length.

With clutch actuator 50 in its unactuated state (FIG. 2), actuator housing 51 and actuator piston 55 are each in abutting contact with endwall 46 of case 12, biased towards the left as viewed in FIG. 2 by side gear 24 exerting an axial force through its surfaces 35, 36 and thrust washers 79, 80 to housing portion 52 and piston portion 56, respectively. Side gear 24 is biased towards the left as viewed in FIG. 2 through the axial forces exerted thereon by intermeshed pinion gears 28, a forces which tend to separate the side gears from the pinion gears. A small portion of the rotational forces exerted by the angled pinion gear teeth on the mating surfaces of the angled teeth of side gear 24 is translated into an axially directed force component which urges side gear 24 towards the left as viewed in FIG. 2.

The transfer of fluid from either fluid chamber 68 or 70 to the other fluid chamber urges side gear 24 to the right as viewed in FIGS. 3 and 4. If fluid is transferred from fluid chamber 68 to fluid chamber 70, as shown in FIG. 3, fluid chamber 70 expands and fluid chamber 68 collapses. Such a fluid transfer forces actuator housing 51 to move to the right and actuator piston 55 to remain to the left as viewed in FIG. 3. In this condition, clutch actuator 50 expands axially such that actuator housing 51 presses against side gear 24 through thrust washer 79 and actuator piston 55 presses against endwall 46, thereby urging side gear 24 to the right.

If fluid is transferred from fluid chamber 70 to fluid chamber 68, as shown in FIG. 4, fluid chamber 68 expands and fluid chamber 70 collapses. Such a fluid transfer forces actuator housing 51 to remain to the left and actuator piston 55 to move to the right as viewed in FIG. 4. In this condition, clutch actuator 50 expands axially such that actuator housing 51 presses against endwall 46 and actuator piston 55 presses against side gear 24 through thrust washer 80, thereby urging side gear 24 to the right. Therefore, fluid transfer in either direction results in clutch actuator 50 expanding such that actuator housing 51 and actuator piston 55 move relative to one another in axially opposite directions whereby one actuator portion presses against side gear 24 and the other actuator portion presses against endwall 46, and side gear 24 is urged to the right.

The speed difference between output shafts 21, 23 and casing 12 actuates gerotor assembly 72 which axially expands clutch actuator 50, which in turn forces side gear 24 to move to the right. The movement of side gear 24 is transmitted to gear/cone member 26 by transfer block 30 to seat frusto-conical surface 41 against surface 42. The seating of surface 41 against surface 42 transfers frictional torque between casing 12 and gear/cone member 26 to reduce the speed difference between output shafts 21 and 23.

Once the differential rotation between output shafts 21, 23 and casing 12, and fluid transfer through gerotor pump assembly 72 have been sufficiently reduced, pressure in the high pressure fluid chamber continues to be relieved through bypass orifice 67 and the pressures in fluid chambers 68, 70 equalize. Therefore, it can be seen that present limited slip differential 10 is a speed sensitive differential. The flow through bypass orifice 67 also reduces the volume of the high pressure fluid chamber and increases the volume of the low pressure fluid chamber. The reduction of pressure in the high pressure fluid chamber, combined with the separation forces exerted on side gear 24 by pinion gears 28 and the opposing force exerted on side gear 24 by transfer block 30, which urge side gear 24 towards the left as viewed in FIGS. 1–4, retracts clutch actuator 50. The retraction of clutch actuator 50 reduces the rightwardly directed force applied by the actuator to side gear 24 and transfer block 30. This reduction in the rightwardly directed force on transfer block 30, which acts on gear/cone member 26 reduces the seating force between frusto-conical surfaces 41 and 42 and reducing the frictional torque transferred therebetween.

The operation of the limited slip differential 10 is now described. Initially, in the resting condition, wherein the components of differential 10 have been interconnected and assembled as described above, differential 10 is connected to output shafts 21, 23, which are respectively coupled to stationary wheels that are in contact with a ground surface, no turning force is applied to differential 10 and differential casing 12 is stationary. An attached engine provides torque to the attached wheels in the conventional manner, namely, through the ring gear (not shown) attached to flange 14, differential casing 12, cross pin 32, pinion gears 28, side gear 24 and gear/cone member 26, splines 25 and 27, output shafts 21 and 23, to wheels (not shown) attached to the output shafts.

In situations where the vehicle is unable to generate torque, i.e. one wheel is on a surface having a low coefficient of friction, differentiation will occur and the limited slip feature is desired to prevent a spin out. When differentiation occurs, meshing rotation occurs between the root and teeth of pinion gear 28 and side gear 24 and gear portion 29 of gear/cone member 26. In such a case, the limited slip feature is actuated by the action of gerotor pump assembly 72 in combination with actuator housing 51 and actuator piston 55.

Differentiation rotates impeller 88 and internal gear 90 of gerotor pump assembly 72 with respect to actuator piston 55 to transfer fluid from fluid chamber 68 or 70 to the other fluid chamber. The direction of fluid transfer depends on the rotational direction of output shaft 21 with respect to casing 12. The transfer of fluid from one fluid chamber to the other chamber axially expands clutch actuator 50 wherein actuator housing 51 and actuator piston 55 move relative to one another in axially opposite directions to press against side gear 24 and endwall 46. The force on side gear 24 is transmitted to gear/cone member 26 through transfer block 30 and seats frusto-conical surface 41 against surface 42. The seating of surface 41 against surface 42 transfers frictional torque from casing 12 to gear/cone member 26 to limit the differential rotation and transfer torque to the wheel having traction.

As clutch actuator 50 is a sealed, self contained mechanism, no further connections to a fluid source, fluid sink or associated assemblies are necessary. Therefore, clutch actuator 50 operates in a simple, reliable manner.

While this invention has been described as having an exemplary design, the present invention may be further modified within the spirit and scope of this disclosure. For example, the number of teeth 89 and recesses 91 associated with gerotor pump assembly 72 may be adjusted as desired to provide the desired fluid transfer characteristics. Also, the size of bypass orifice 67, as well as the angle of frusto-conical surfaces 41 and 42 may be adjusted to achieve the desired clutch characteristics. Further, although a gerotor type pump is shown as the fluid pressure source, any self-contained pump mechanism which is adapted to transfer fluid from one fluid chamber to another based on relative rotation between an output element and the differential casing may be used. Therefore, this application is intended to cover any variations, uses, or adaptations of the invention using its general principles. Further, this application is intended to cover such departures from the present disclosure as come within known or customary practice in the art to which this invention pertains.

What is claimed is:

1. A limited slip differential, comprising:
   a rotatable casing;
   a pinion gear rotatably supported in said casing;
   a side gear rotatably supported in said casing and coupled to an output element, said side gear meshingly engaged with said pinion gear;
   a clutch disposed in said casing on one axial side of said side gear and operatively coupled to said side gear, said clutch adapted to frictionally transfer torque between said casing and said side gear; and
   a sealed clutch actuator disposed in said casing on the opposite axial side of said side gear, said clutch actuator having a fluid pressure source contained therein, said fluid pressure source transferring fluid in response to differential rotation between said side gear and said casing, said clutch actuator urging said clutch to move and to frictionally seat against said rotatable casing in response to transfer of fluid by said fluid pressure source.

2. The limited slip differential of claim 1, wherein said sealed clutch actuator expands axially with respect to said rotatable casing in response to a transfer of fluid by said fluid pressure source.

3. A limited slip differential comprising a rotatable casing, a pinion gear rotatably supported in said casing, a side gear rotatably supported in said casing and coupled to an output element, said side gear meshingly engaged with said pinion gear, a clutch disposed in said casing and operatively coupled to said side gear, said clutch adapted to frictionally transfer torque between said casing and said side gear, and a sealed clutch actuator disposed in said casing, said clutch actuator having a fluid pressure source contained therein, said fluid pressure source transferring fluid in response to differential rotation between said side gear and said casing, said clutch actuator urging said clutch to move and to frictionally seat against said rotatable casing in response to transfer of fluid by said fluid pressure source, wherein said sealed clutch actuator comprises a clutch actuator housing and a clutch actuator piston, said clutch actuator piston disposed around said output element, said clutch actuator housing disposed around said clutch actuator piston, said clutch actuator housing and said clutch actuator piston defining first and second fluid chambers, said first and second fluid chambers fluidly connected by said fluid pressure source, whereby fluid transfer from one said fluid chamber to another said fluid chamber by said fluid pressure source causes said clutch actuator housing and clutch actuator piston to move in opposite directions.

4. The limited slip differential of claim 3, wherein said clutch actuator housing is rotationally fixed with respect to said casing by anti-rotation pins disposed in recesses of said clutch actuator housing and said casing, said clutch actuator piston is rotationally fixed with respect to said casing by anti-rotation pins disposed in recesses of said clutch actuator piston and said casing.

5. The limited slip differential of claim 4, wherein said clutch actuator piston includes a bypass orifice in fluid communication between said first and second fluid chambers, whereby fluid flow through said bypass orifice equalizes fluid pressure between said first and second fluid chambers.

6. A limited slip differential comprising a rotatable casing, a pinion gear rotatably supported in said casing, a side gear rotatably supported in said casing and coupled to an output element, said side gear meshingly engaged with said pinion gear, a clutch disposed in said casing and operatively coupled to said side gear, said clutch adapted to frictionally transfer torque between said casing and said side gear, a sealed clutch actuator disposed in said casing, said clutch actuator having a fluid pressure source contained therein, said fluid pressure source transferring fluid in response to differential rotation between said side gear and said casing, said clutch actuator urging said clutch to move and to frictionally seat against said rotatable casing in response to transfer of fluid by said fluid pressure source, and a transfer block disposed between said side gear and said clutch, said transfer block transmitting axial force from said side gear to said clutch.

7. A limited slip differential comprising a rotatable casing, a pinion gear rotatably supported in said casing, a side gear rotatably supported in said casing and coupled to an output element, said side gear meshingly engaged with said pinion gear, a clutch disposed in said casing and operatively coupled to said side gear, said clutch adapted to frictionally transfer torque between said casing and said side gear, and a sealed clutch actuator disposed in said casing, said clutch actuator having a fluid pressure source contained therein, said fluid pressure source transferring fluid in response to differential rotation between said side gear and said casing, said clutch actuator urging said clutch to move and to frictionally seat against said rotatable casing in response to transfer of fluid by said fluid pressure source, wherein said clutch comprises a frusto-conical surface adapted to seat against a complementary frusto-conical surface disposed on said casing.

8. A limited slip differential comprising a rotatable casing, a pinion gear rotatably supported in said casing, a side gear rotatably supported in said casing and coupled to an output element, said side gear meshingly engaged with said pinion gear, a clutch disposed in said casing and operatively coupled to said side gear, said clutch adapted to frictionally transfer torque between said casing and said side gear, a sealed clutch actuator disposed in said casing, said clutch actuator having a fluid pressure source contained therein, said fluid pressure source transferring fluid in response to differential rotation between said side gear and said casing, said clutch actuator urging said clutch to move and to frictionally seat against said rotatable casing in response to transfer of fluid by said fluid pressure source, and a second side gear and a second output element, said second side gear rotatably supported in said casing and coupled to said second output element, said second side gear meshingly engaged with said pinion gear, said second side gear coupled with said clutch, wherein said second side gear transmits axial force to said clutch.

9. A limited slip differential comprising a rotatable casing, a pinion gear rotatably supported in said casing, a side gear rotatably supported in said casing and coupled to an output element, said side gear meshingly engaged with said pinion gear, a clutch disposed in said casing and operatively coupled to said side gear, said clutch adapted to frictionally transfer torque between said casing and said side gear, and a sealed clutch actuator disposed in said casing, said clutch actuator having a fluid pressure source contained therein, said fluid pressure source transferring fluid in response to differential rotation between said side gear and said casing, said clutch actuator urging said clutch to move and to frictionally seat against said rotatable casing in response to transfer of fluid by said fluid pressure source, wherein said fluid pressure source is a gerotor type pump.

10. The limited slip differential of claim 9, wherein said gerotor type pump comprises an impeller disposed inside an internal gear, said impeller coupled to said output element.

11. A limited slip differential, comprising:
 a rotatable casing;
 a pinion gear rotatably supported in said casing;
 a side gear rotatably supported in said casing and coupled to an output element, said side gear meshingly engaged with said pinion gear;
 a clutch disposed in said casing and operatively coupled to said side gear, said clutch adapted to frictionally transfer torque between said casing and said side gear; and
 a clutch actuator disposed in said casing, said clutch actuator comprising a clutch actuator housing and a clutch actuator piston defining first and second fluid chambers, said first and second fluid chambers fluidly connected by a fluid pressure source, said fluid pressure source transferring fluid from one of said fluid chambers to another said fluid chamber in response to differential rotation between said side gear and said casing, said clutch actuator housing and said clutch actuator piston adapted to move with respect to said casing to urge said clutch to frictionally seat against said casing in response to transfer of fluid by said fluid pressure source.

12. A limited slip differential, comprising a rotatable casing, a pinion gear rotatably supported in said casing, a side gear rotatably supported in said casing and coupled to an output element, said side gear meshingly engaged with said pinion gear, a clutch disposed in said casing and operatively coupled to said side gear, said clutch adapted to frictionally transfer torque between said casing and said side gear, and a clutch actuator disposed in said casing, said clutch actuator comprising a clutch actuator housing and a clutch actuator piston defining first and second fluid chambers, said first and second fluid chambers fluidly connected by a fluid pressure source, said fluid pressure source transferring fluid from one of said fluid chambers to another said fluid chamber in response to differential rotation between said side gear and said casing, said clutch actuator housing and said clutch actuator piston adapted to move with respect to said casing to urge said clutch to frictionally seat against said casing in response to transfer of fluid by said fluid pressure source, wherein said clutch actuator housing is rotationally fixed with respect to said casing by anti-rotation pins disposed in recesses of said clutch actuator housing and said casing, said clutch actuator piston is rotationally fixed with respect to said casing by anti-rotation pins disposed in recesses of said clutch actuator piston and said casing.

13. A limited slip differential, comprising a rotatable casing, a pinion gear rotatably supported in said casing, a side gear rotatably supported in said casing and coupled to an output element, said side gear meshingly engaged with said pinion gear, a clutch disposed in said casing and operatively coupled to said side gear, said clutch adapted to frictionally transfer torque between said casing and said side gear, and a clutch actuator disposed in said casing, said clutch actuator comprising a clutch actuator housing and a clutch actuator piston defining first and second fluid chambers, said first and second fluid chambers fluidly connected by a fluid pressure source, said fluid pressure source transferring fluid from one of said fluid chambers to another said fluid chamber in response to differential rotation between said side gear and said casing, said clutch actuator housing and said clutch actuator piston adapted to move with respect to said casing to urge said clutch to frictionally seat against said casing in response to transfer of fluid by said fluid pressure source, wherein said clutch actuator piston includes a bypass orifice in fluid communication between said first and second fluid chambers, whereby fluid flow through said bypass orifice equalizes fluid pressure between said first and second fluid chambers.

14. A limited slip differential, comprising a rotatable casing, a pinion gear rotatably supported in said casing, a side gear rotatably supported in said casing and coupled to an output element, said side gear meshingly engaged with said pinion gear, a clutch disposed in said casing and operatively coupled to said side gear, said clutch adapted to frictionally transfer torque between said casing and said side gear, a clutch actuator disposed in said casing, said clutch actuator comprising a clutch actuator housing and a clutch actuator piston defining first and second fluid chambers, said first and second fluid chambers fluidly connected by a fluid pressure source, said fluid pressure source transferring fluid from one of said fluid chambers to another said fluid chamber in response to differential rotation between said side gear and said casing, said clutch actuator housing and said clutch actuator piston adapted to move with respect to said casing to urge said clutch to frictionally seat against said casing in response to transfer of fluid by said fluid pressure source, and a transfer block disposed between said side gear and said clutch, said transfer block transmitting axial force from said side gear to said clutch.

15. A limited slip differential, comprising a rotatable casing, a pinion gear rotatably supported in said casing, a side gear rotatably supported in said casing and coupled to an output element, said side gear meshingly engaged with said pinion gear, a clutch disposed in said casing and operatively coupled to said side gear, said clutch adapted to frictionally transfer torque between said casing and said side gear, and a clutch actuator disposed in said casing, said clutch actuator comprising a clutch actuator housing and a clutch actuator piston defining first and second fluid chambers, said first and second fluid chambers fluidly connected by a fluid pressure source, said fluid pressure source transferring fluid from one of said fluid chambers to another said fluid chamber in response to differential rotation between said side gear and said casing, said clutch actuator housing and said clutch actuator piston adapted to move with respect to said casing to urge said clutch to frictionally seat against said casing in response to transfer of fluid by said fluid pressure source, wherein said clutch comprises a frusto-conical surface adapted to seat against a complementary frusto-conical surface disposed on said casing.

16. A limited slip differential, comprising a rotatable casing, a pinion gear rotatably supported in said casing, a side gear rotatably supported in said casing and coupled to an output element, said side gear meshingly engaged with said pinion gear, a clutch disposed in said casing and operatively coupled to said side gear, said clutch adapted to frictionally transfer torque between said casing and said side gear, and a clutch actuator disposed in said casing, said clutch actuator comprising a clutch actuator housing and a clutch actuator piston defining first and second fluid chambers, said first and second fluid chambers fluidly connected by a fluid pressure source, said fluid pressure source transferring fluid from one of said fluid chambers to another said fluid chamber in response to differential rotation between said side gear and said casing, said clutch actuator housing and said clutch actuator piston adapted to move with respect to said casing to urge said clutch to frictionally seat against said casing in response to transfer of fluid by said fluid pressure source, wherein said fluid pressure source is a gerotor type pump.

17. The limited slip differential of claim 16, wherein said gerotor type pump comprises an impeller disposed inside an internal gear, said impeller coupled to said output element.

* * * * *